(12) United States Patent
Chiu et al.

(10) Patent No.: US 8,704,580 B2
(45) Date of Patent: Apr. 22, 2014

(54) CIRCUIT SHARING TIME DELAY INTEGRATOR

(75) Inventors: Chin-Fong Chiu, Hsinchu (TW); Hann-Huei Tsai, Hsinchu (TW); Wen-Hsu Chang, Hsinchu (TW); Chih-Cheng Hsieh, Hsinchu (TW); Kuo-Wei Cheng, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 14 days.

(21) Appl. No.: 13/594,559

(22) Filed: Aug. 24, 2012

(65) Prior Publication Data

US 2013/0335132 A1   Dec. 19, 2013

(30) Foreign Application Priority Data

Jun. 13, 2012   (TW) .............................. 101121184 A

(51) Int. Cl.
G06G 7/19 (2006.01)
(52) U.S. Cl.
USPC .............................. 327/336; 327/337; 327/345

(58) Field of Classification Search
None
See application file for complete search history.

(56) References Cited

U.S. PATENT DOCUMENTS

| 4,245,288 | A | * | 1/1981 | Frosch et al. | 363/40 |
|---|---|---|---|---|---|
| 5,925,883 | A | * | 7/1999 | Woolaway, II | 250/370.08 |
| 2007/0012867 | A1 | * | 1/2007 | Wolters et al. | 250/214 R |

* cited by examiner

*Primary Examiner* — Tuan T Lam
(74) *Attorney, Agent, or Firm* — Morris, Manning & Martin, LLP; Juan Carlos A. Marquez

(57) ABSTRACT

The present invention discloses a circuit sharing time delay integrator structure. The major composing elements of this circuit sharing time delay integrator structure are: a sharing circuit, a first control block, a plurality of second control blocks and a timing set generated by a timing generator circuit. The sharing circuit can be an OP-AMP, an active load, or any of a variety of combinations used in signal accumulation applications. With the implementation of the present invention to applications of signal accumulations, the necessity of an adder circuitry is eliminated, the overall circuitry and hence the total amount of transistors required when producing the integrated circuit is massively reduced, and thus a great cost reduction and better timing and power efficiency can all be thereof achieved.

15 Claims, 8 Drawing Sheets

CIRCUIT SHARING TIME DELAY INTEGRATOR

BACKGROUND OF THE INVENTION

1. Technical Field

The present invention relates to time delay integrator structures, and more particularly, to a circuit sharing time delay integrator structure.

2. Description of Related Art

Referring to FIG. 1, there is shown a circuit diagram of a conventional time delay integrator structure 100 for use in CMOS image sensing nowadays. FIG. 1 depicts a constituent unit of the conventional time delay integrator, wherein the number of the constituent units of the conventional time delay integrator equals the number of the photo detector signals to be accumulated at each pixel in operation.

As shown in FIG. 1, an output is sent to a photo detector of a preceding-level time delay integrator constituent unit and then electrically connected to a feedback amplifier circuit via a switch. Afterward, an output from an amplifying circuit is electrically connected to a next-level time delay integrator constituent unit. In doing so, it is feasible to accumulate the signals of the photo detectors at all levels.

The aforesaid implementation method does achieve signal accumulation. However, its most notable drawback is that the quantity of required circuits increases with the quantity of the signals to be accumulated and thus, in practice, the circuits are so bulky that they occupy much space. As a result, the total amount of transistors required when producing an integrated circuit is great, thereby incurring high manufacturing costs.

SUMMARY OF THE INVENTION

The present invention provides a circuit sharing time delay integrator structure. In the first embodiment of the present invention, the circuit sharing time delay integrator structure comprises a shared feedback type operational amplifier circuit, a first control block, a plurality of second control blocks, and a set of clock signals. In the second embodiment of the present invention, the circuit sharing time delay integrator structure comprises a shared active circuit module, a third control block, a plurality of fourth control blocks, and a set of clock signals. With signal accumulation being performed by the circuit sharing time delay integrator structure, an adder circuitry is dispensed with. Furthermore, circuit sharing reduces the overall circuitry greatly, enables a great reduction in the total amount of transistors required for manufacturing an integrated circuit, and cuts manufacturing costs.

In order to achieve the above and other objectives, the present invention provides a circuit sharing time delay integrator structure, comprising: a feedback type operational amplifier circuit shared by the time delay integrator structure in its entirety; a first control block; a plurality of second control blocks; and clock signals for triggering an ON state of the first control block and then triggering an ON state of the second control blocks in sequence. In doing so, it is feasible to reduce the quantity of circuits greatly and still effectuate signal accumulation.

Implementation of the present invention at least involves the following inventive steps:

1. Reduce the quantity of operational amplifiers or load circuits, and lessen the complexity of the time delay integrator circuit structure.

2. Enable a great reduction in the quantity of transistors required for a manufacturing process of an integrated circuit of the time delay integrator, speed up the manufacturing process, and cut manufacturing costs.

The above description is only a summary of the technical solution of the present invention. In order to shed more light on the technical means of the present invention, a detailed description of the preferred embodiments is provided below with reference to the accompanying drawings so that a person skilled in the art can easily understand the above and other objects, as well as the characteristics and advantages, of the present invention and implement the present invention according to the contents disclosed herein.

DETAILED DESCRIPTION OF THE EMBODIMENTS OF THE INVENTION

Figure 1:
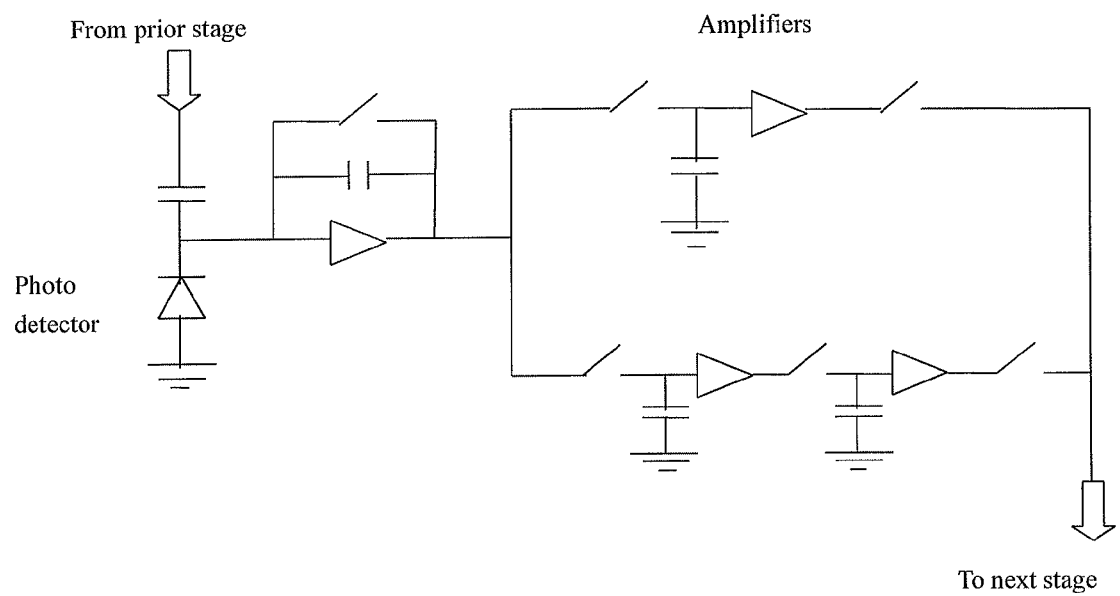
FIG. 1 is a circuit diagram of a conventional time delay integrator.
Figure 2:
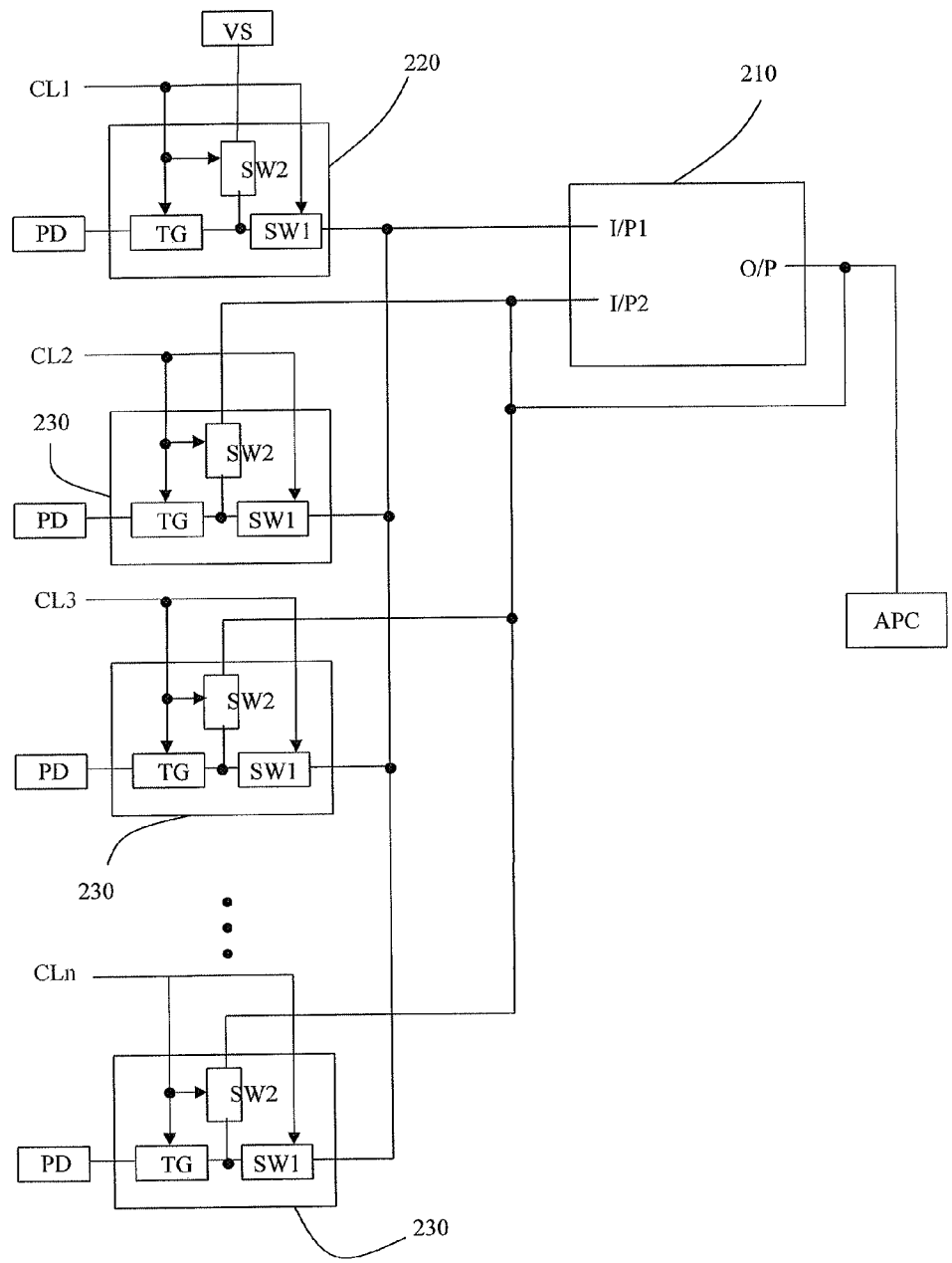
FIG. 2 is a circuit diagram of a circuit sharing time delay integrator according to an embodiment of the present invention.
Figure 3:
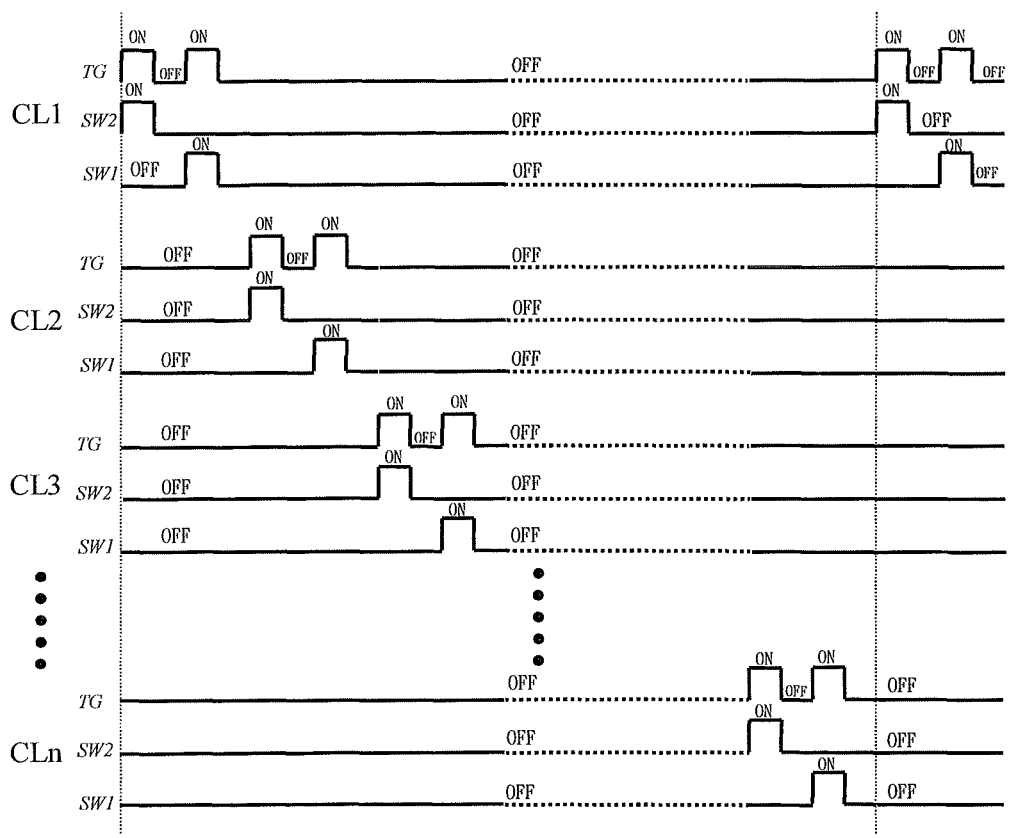
FIG. 3 is a schematic view of clock signals generated by a set of clock signals according to an embodiment of the present invention.
Figure 4:
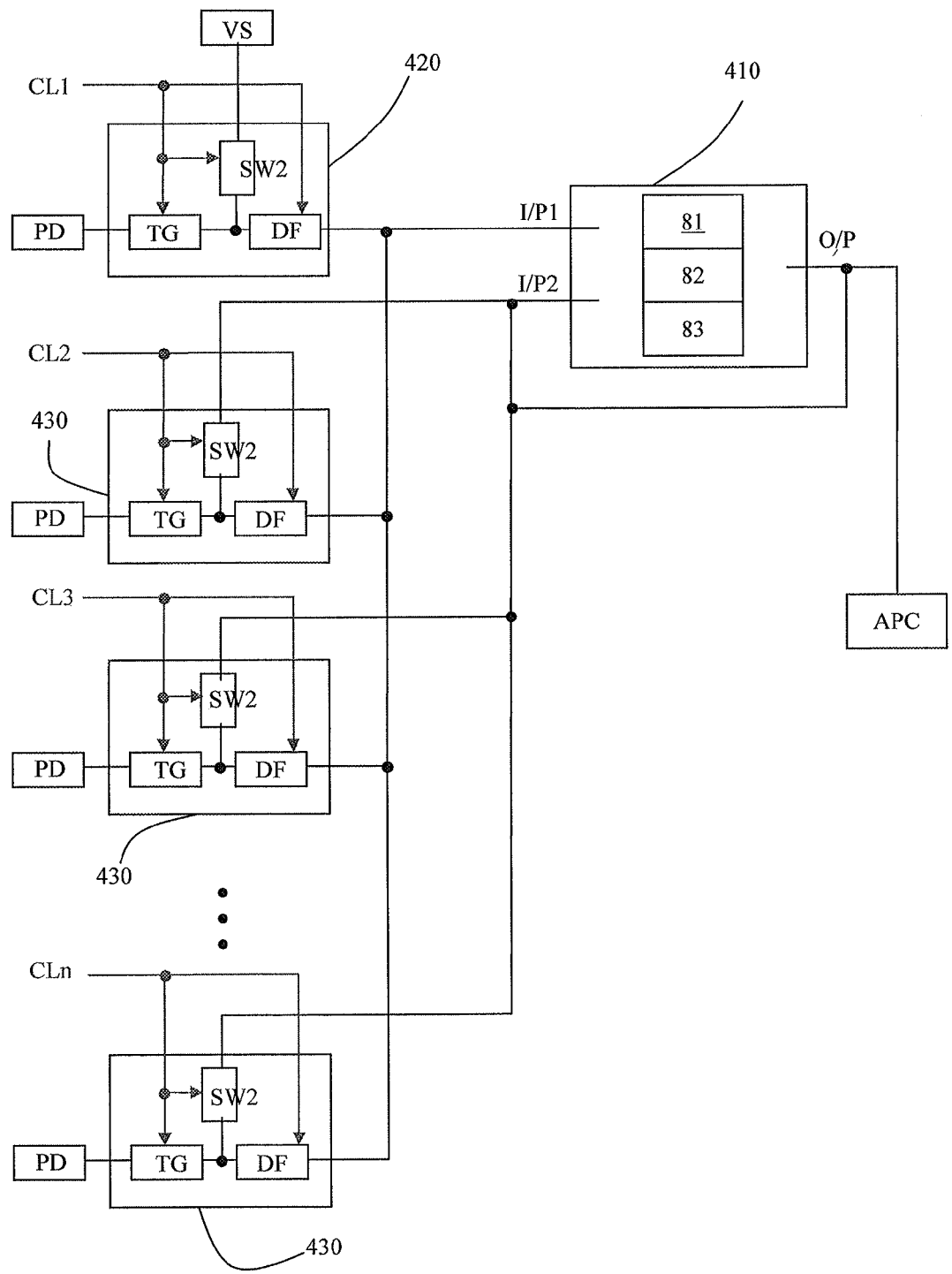
FIG. 4 is a circuit diagram of another circuit sharing time delay integrator according to an embodiment of the present invention.
Figure 5:
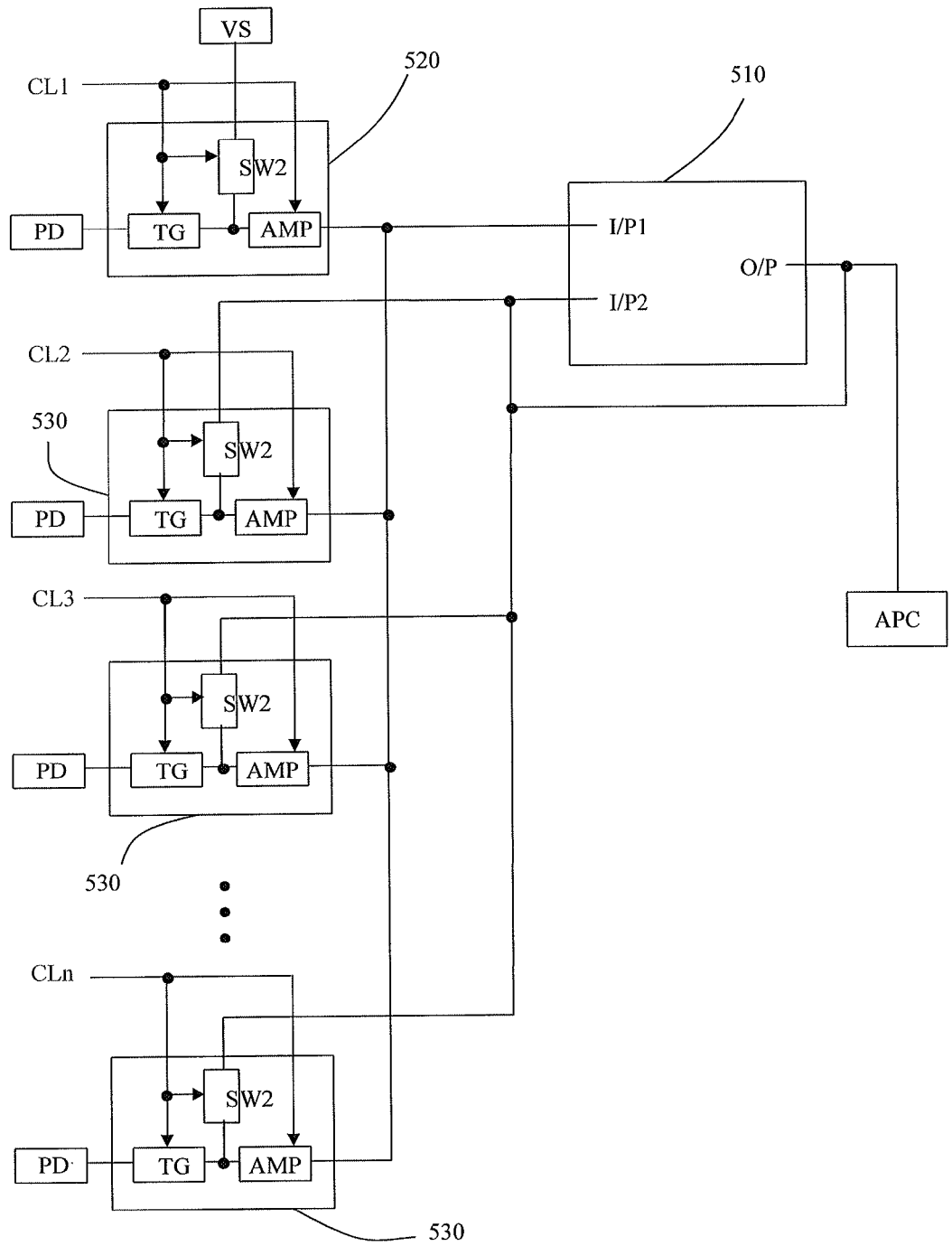
FIG. 5 is a circuit diagram of yet another circuit sharing time delay integrator according to an embodiment of the present invention.
Figure 6:
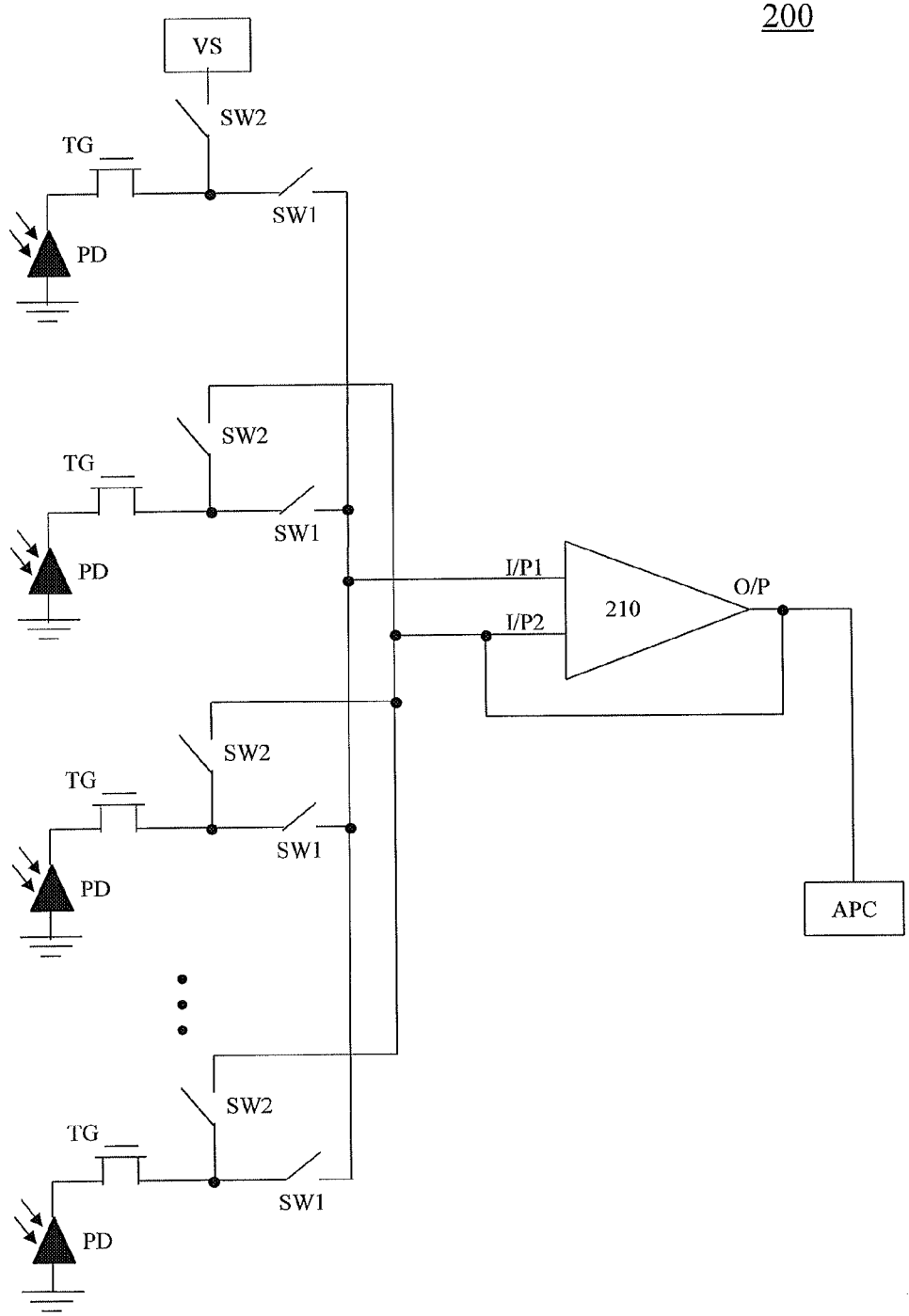
FIG. 6 is a circuit diagram of implementation of a circuit sharing time delay integrator of FIG. 2 according to an embodiment of the present invention.
Figure 7:
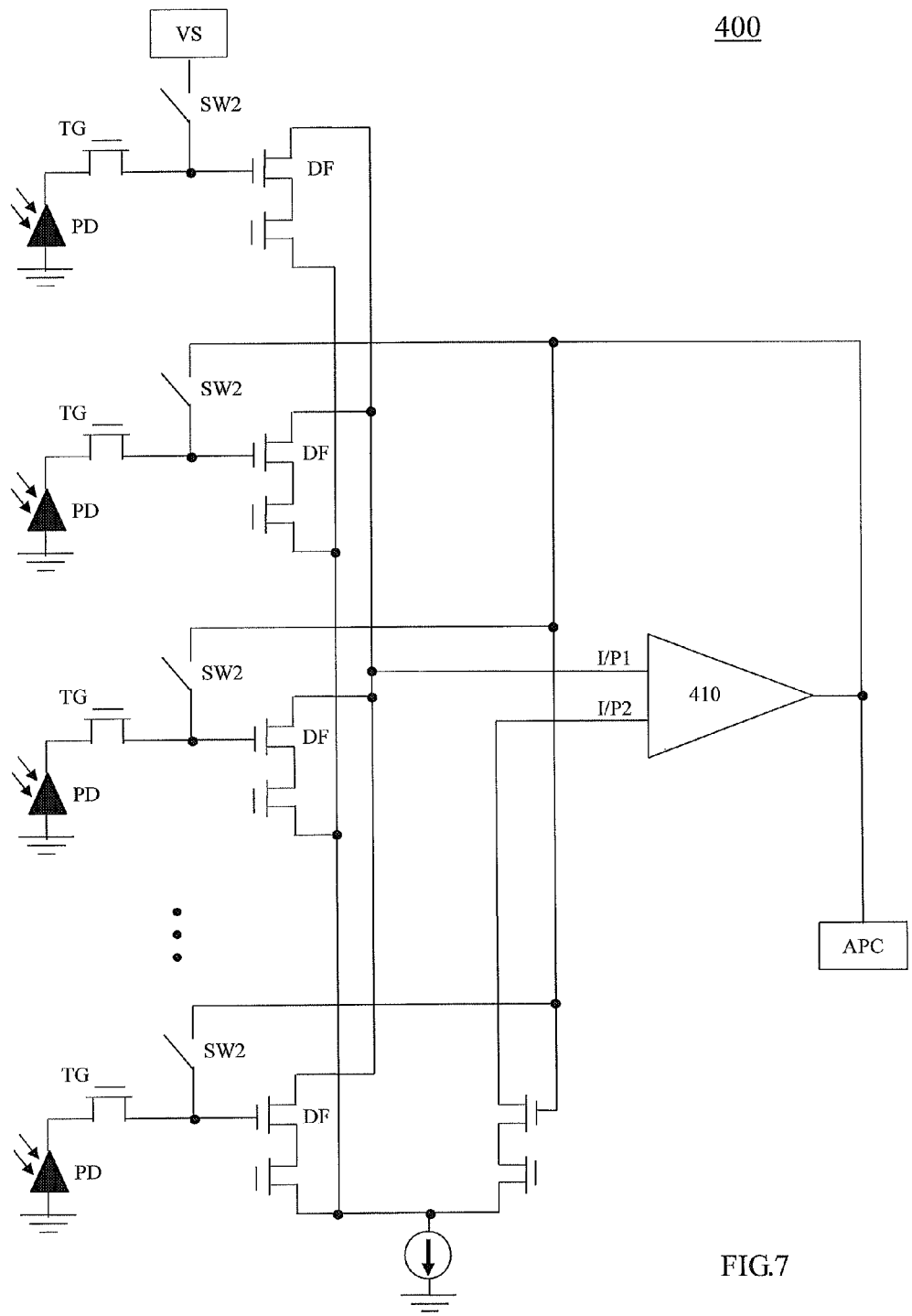
FIG. 7 is a circuit diagram of implementation of another circuit sharing time delay integrator of FIG. 4 according to an embodiment of the present invention.
Figure 8:
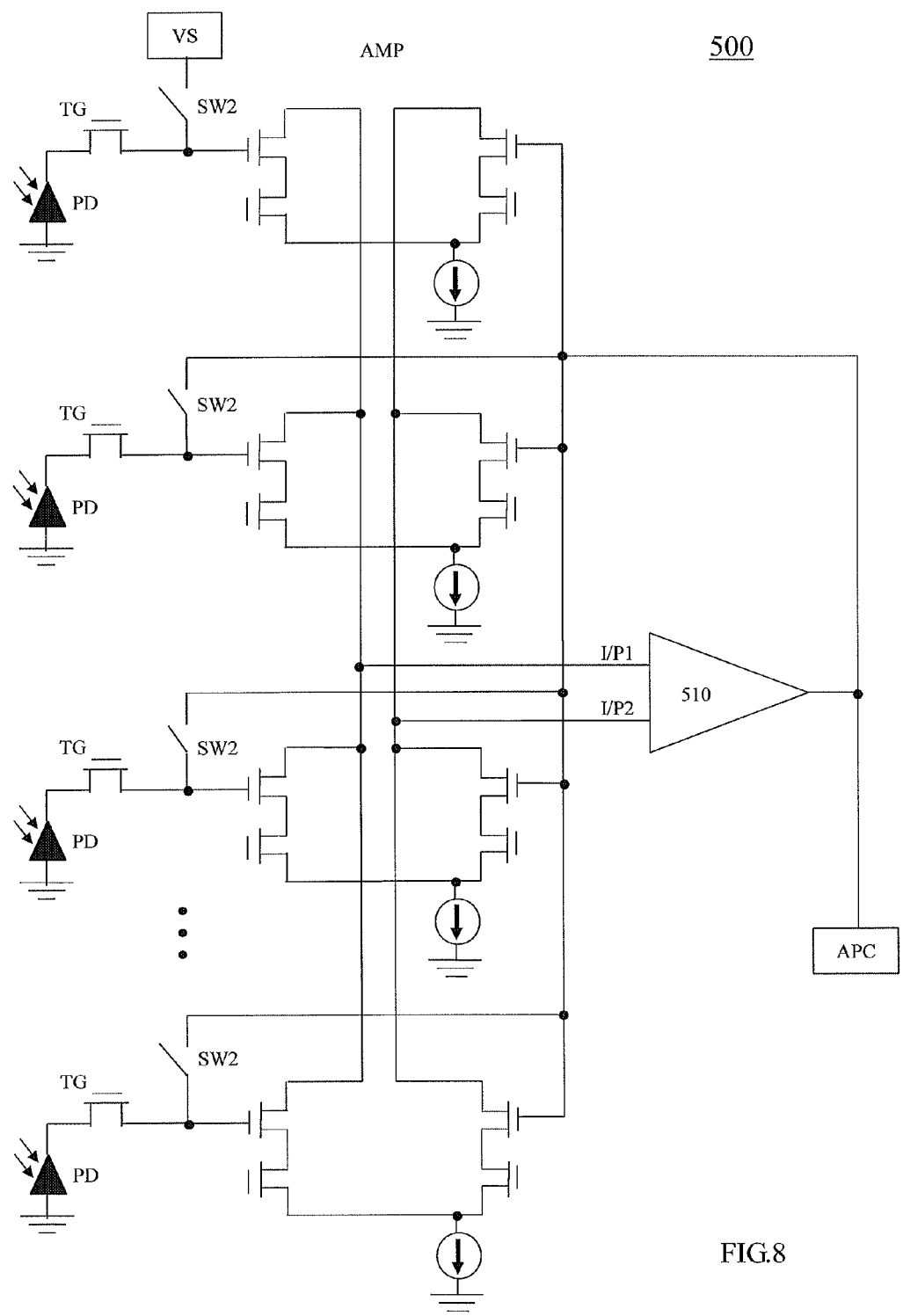
FIG. 8 is a circuit diagram of implementation of yet another circuit sharing time delay integrator of FIG. 5 according to an embodiment of the present invention.

FIG. 2 is a circuit diagram of a time delay integrator structure 200 having a shared feedback type operational amplifier circuit 210 according to an embodiment of the present invention. FIG. 3 is a schematic view of clock signals 300 (CL1~CLn) generated by a set of clock signals according to an embodiment of the present invention. FIG. 4 and FIG. 5 are circuit diagrams of time delay integrator structures 400, 500 equipped with shared active load circuit modules 410, 510. FIG. 6 is a circuit diagram of implementation of the time delay integrator structure 200 having the shared feedback type operational amplifier circuit 210 according to an embodiment of the present invention. FIG. 7 and FIG. 8 are circuit diagrams of implementation of the time delay integrator structures 400, 500 equipped with shared active load circuit modules according to an embodiment of the present invention.

Referring to FIG. 2, FIG. 4, and FIG. 5, the present invention provides circuit sharing time delay integrator structures 200, 400, 500 comprising: a sharing circuit provided in the form of the feedback type operational amplifier circuit 210, the active circuit module 410, or the active load circuit module 510; a first control block 220, a third control block 420, or a fifth control block 520; a plurality of second control blocks 230, fourth control blocks 430, or sixth control blocks 530; and the clock signals 300 (CL1~CLn).

Referring to FIG. 2, there is shown the circuit structure 200 of a circuit sharing time delay integrator of the present invention, comprising the feedback type operational amplifier circuit 210, the first control block 220, the plurality of second control blocks 230, and the clock signals 300. The feedback type operational amplifier circuit 210 has a first input end I/P1, a second input end I/P2, and an output end O/P, and effectuates feedback by electrical connection of the second input end I/P2 and the output end O/P.

The first control block 220 comprises a transfer gate TG and a first switch SW1 which are connected in series to the first input end I/P1. An input end of the transfer gate TG is connected in series to a photo detector PD. The first control block 220 comprises a second switch SW2. One end of the second switch SW2 is electrically connected between the transfer gate TG and the first switch SW1, and the other end of the second switch SW2 is electrically connected to a reset voltage source VS. The reset voltage source VS serves as an initial voltage source for the circuit structure 200 of the circuit sharing time delay integrator in its entirety.

The second control blocks 230 each comprises a transfer gate TG and the first switch SW1 that are connected in series to the first input end I/P1. An input end of the transfer gate TG is connected in series to a photodetector PD. The second control blocks 230 each comprises a second switch SW2. One end of the second switch SW2 is electrically connected between the first switch SW1 and the transfer gate TG in the second control blocks 230, and the other end of the second switch SW2 is electrically connected to the second input end I/P2.

In the circuit structure 200 of the circuit sharing time delay integrator of the present invention, the feedback type operational amplifier circuit 210 is shared by the first control block 220 and the second control blocks 230, thereby serving as the sharing circuit of the present invention.

The clock signals 300 (CL1~CLn) provide a set of clocks required for the operation of the time delay integrator. First, the clock signals 300 (CL1~CLn) trigger an ON state in the first control block 220. Then, the clock signals 300 (CL1~CLn) trigger ON states in the second control blocks 230 in sequence. Signals received by a photo detector PD are accumulated in every instance of triggering an ON state. After the signals of every photo detectors PD have been accumulated by the circuit structure 200 of the circuit sharing time delay integrator of the present invention, the final total output is effectuated by a back-end processing circuit APC. The conducting state and the cut off state of the clock signals are denoted by ON and OFF, respectively.

Referring to FIG. 4, in another embodiment of the present invention, the circuit structure 400 of the circuit sharing time delay integrator comprises the active circuit module 410, the third control block 420, the fourth control blocks 430, and the clock signals 300. The active circuit module 410 comprises a constant current source 81, a negative end input unit 82, and a load unit of a feedback type amplifying circuit 83, and has a first input end I/P1, a second input end I/P2, and an output end O/P. The active circuit module 410 effectuates feedback by electrical connection of the second input end I/P2 and the output end O/P.

The third control block 420 comprises a transfer gate TG and a source follower unit DF that are connected in series to the first input end I/P1. An input end of the transfer gate TG is connected in series to a photo detector PD. The third control block 420 further comprises a second switch SW2. One end of the second switch SW2 is electrically connected between the transfer gate TG and the source follower unit DF, and the other end of the second switch SW2 is electrically connected to the reset voltage source VS. The reset voltage source VS serves as an initial voltage source for the circuit structure of the circuit sharing time delay integrator in its entirety.

The fourth control blocks 430 each comprises a transfer gate TG and a source follower unit DF that are connected in series to the first input end I/P1. An input end of the transfer gate TG is connected in series to a photo detector PD. The fourth control blocks 430 each comprise a second switch SW2. One end of the second switch SW2 is electrically connected between the transfer gate TG and the source follower unit DF, and the other end of the second switch SW2 is electrically connected to the second input end I/P2.

The clock signals 300 (CL1~CLn) trigger an ON state in the third control block 420, and then trigger ON states in the fourth control blocks 430 in sequence. Signals received by a photo detector PD are accumulated in every instance of triggering an ON state. After the signals of every photo detectors PD have been accumulated by the circuit structure 400 of the circuit sharing time delay integrator of the present invention, the final total output is effectuated by the back-end processing circuit APC. The conducting state and cut off state of the clock signals are denoted by ON and OFF, respectively.

Referring to FIG. 5, in another embodiment of the present invention, the circuit structure 500 of the circuit sharing time delay integrator comprises an active load circuit module 510, the fifth control block 520, the plurality of sixth control blocks 530, and the clock signals 300. The active load circuit module 510 is a load unit of a feedback amplifying circuit and has a first input end I/P1, a second input end I/P2, and an output end O/P. The second input end I/P2 is electrically connected to the output end O/P, thereby providing a path of signal transmission to the next level.

The fifth control block 520 comprises a transfer gate TG and an amplifier circuit AMP that are connected in series to the first input end I/P1. An input end of the transfer gate TG is connected in series to a photo detector PD. The fifth control block 520 further comprises a second switch SW2. One end of the second switch SW2 is electrically connected between the transfer gate TG and the amplifier circuit AMP, and the other end of the second switch SW2 is electrically connected to the reset voltage source VS. The reset voltage source VS serves as an initial voltage source for the circuit structure of the circuit sharing time delay integrator in its entirety.

The sixth control blocks 530 each comprises a transfer gate TG and an amplifier circuit AMP that are connected in series to the first input end I/P1. An input end of each said transfer gate TG is connected in series to a photo detector PD. The sixth control blocks 530 each comprise a second switch SW2. One end of the second switch SW2 is electrically connected between the transfer gate TG and the amplifier circuit AMP, and the other end of the second switch SW2 is electrically connected to the second input end I/P2.

The clock signals 300 (CL1~CLn) trigger an ON state in the fifth control block 520, and then trigger ON states in the sixth control blocks 530 in sequence. In the circuit structure 500 of the circuit sharing time delay integrator, the active load circuit module 510 is shared by the fifth control block 520 and the sixth control blocks 530. After the signals of every photo detectors PD have been accumulated by the circuit structure 500 of the circuit sharing time delay integrator of the present invention, the final total output is effectuated by the back-end processing circuit APC. The conducting state and cut off state of the clock signals are denoted by ON and OFF, respectively.

The embodiments described above are only the preferred embodiments of, but not limitations to, the present invention. While the present invention is disclosed herein with reference to the preferred embodiments, the embodiments are not intended to restrict the present invention. Based on the technical contents disclosed herein, a person skilled in the art may alter or modify the foregoing embodiments and thereby produce equivalent embodiments without departing from the scope of the present invention. Therefore, all minor alterations and equivalent changes which are based on the technical substance of the present invention and made to the foregoing embodiments should be considered as within the scope of the technical solution of the present invention.

What is claimed is:

1. A circuit structure of a circuit sharing time delay integrator, comprising:
    an operational amplifier circuit being a feedback amplifying circuit, having a first input end, a second input end, and an output end, and effectuating feedback by electrical connection of the second input end and the output end;
    a first control block comprising a transfer gate and a first switch that are connected in series to the first input end, the first control block further comprising a second switch, one end of the second switch is electrically connected between the transfer gate and the first switch, and the other end of the second switch is electrically connected to a reset voltage source;
    a plurality of second control blocks each comprising a transfer gate and a first switch that are connected in series to the first input end, the second control blocks each further comprising a second switch, one end of the second switch is electrically connected between the transfer gate and the first switch and the other end of the second switch is electrically connected to the second input end; and
    clock signals for triggering an ON state in the first control block and the second control blocks in sequence.

2. The circuit structure of claim 1, wherein the operational amplifier circuit is shared by the first control block and the second control blocks.

3. The circuit structure of claim 1, wherein the reset voltage source is an initial voltage source for the circuit structure of the circuit sharing time delay integrator.

4. The circuit structure of claim 1, wherein an input end of each said transfer gate is connected in series to a photo detector.

5. The circuit structure of claim 4, wherein a back-end processing circuit makes a final total output of a result of accumulation of signals of each said photo detector by the circuit structure of the circuit sharing time delay integrator.

6. A circuit structure of a circuit sharing time delay integrator, comprising:
    an active circuit module comprising a constant current source, a negative end input unit, and a load unit of a feedback amplifying circuit, having a first input end, a second input end, and an output end, and effectuating feedback by electrical connection of the second input end and the output end;
    a first source following control block comprising a transfer gate and a source following unit that are connected in series to the first input end, the first source following control block further comprising a second switch, one end of the second switch is electrically connected between the transfer gate and the source following unit and the other end of the second switch is electrically connected to a reset voltage source;
    a plurality of second source following control blocks each comprising a transfer gate and a source follower unit which are connected in series to the first input end, the second source following control blocks each further comprising a second switch, one end of the second switch is electrically connected between the transfer gate and the source follower unit and the other end of the second switch is electrically connected to the said second input end; and
    clock signals for triggering ON states in the first and second source following control blocks in sequence.

7. The circuit structure of claim 6, wherein the active circuit module is shared by the first and second source following control blocks.

8. The circuit structure of claim 6, wherein the reset voltage source is an initial voltage source for the circuit structure of the circuit sharing time delay integrator.

9. The circuit structure of claim 6, wherein an input end of each said transfer gate is connected in series to a photo detector.

10. The circuit structure of claim 9, wherein a back-end processing circuit makes a final total output of a result of accumulation of signals of each said photo detector by the circuit structure of the circuit sharing time delay integrator.

11. A circuit structure of a circuit sharing time delay integrator, comprising:
    an active load circuit module being a load unit of a feedback amplifying circuit, having a first input end, a second input end, and an output end, and effectuating feedback by electrical connection of the second input end and the output end;
    a first amplifier control block comprises a transfer gate and an amplifier circuit that are connected in series to the first input end, the first amplifier control block further comprises a second switch, one end of the second switch is electrically connected between the transfer gate and the amplifier circuit and the other end of the second switch is electrically connected to a reset voltage source;
    a plurality of second amplifier control blocks each comprising a transfer gate and an amplifier circuit that are connected in series to the first input end, the second amplifier control blocks each further comprising a second switch, one end of the second switch is electrically connected between the transfer gate and the amplifier circuit and the other end of the second switch is electrically connected to the second input end; and
    clock signals for triggering ON states in the first amplifier control block and the second amplifier control blocks in sequence.

12. The circuit structure of claim 11, wherein the active load circuit module is shared by the first and second amplifier control blocks.

13. The circuit structure of claim 11, wherein the reset voltage source is an initial voltage source for the circuit structure of the circuit sharing time delay integrator.

14. The circuit structure of claim 11, wherein an input end of each said transfer gate is connected in series to a photo detector.

15. The circuit structure of claim 14, wherein a back-end processing circuit makes a final total output of a result of accumulation of signals of each said photo detector by the circuit structure of the circuit sharing time delay integrator.

* * * * *